(12) United States Patent
Panneer et al.

(10) Patent No.: US 10,395,414 B2
(45) Date of Patent: *Aug. 27, 2019

(54) DYNAMIC KERNEL MODIFICATION FOR GRAPHICS PROCESSING UNITS

(71) Applicant: INTEL CORPORATION, Santa Clara, CA (US)

(72) Inventors: Selvakumar Panneer, Portland, OR (US); Carl S. Marshall, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,616

(22) Filed: May 21, 2018

(65) Prior Publication Data

US 2018/0286008 A1 Oct. 4, 2018

Related U.S. Application Data

(63) Continuation of application No. 14/572,597, filed on Dec. 16, 2014, now Pat. No. 10,007,965.

(51) Int. Cl.
*G06T 15/00* (2011.01)

(52) U.S. Cl.
CPC ........ *G06T 15/005* (2013.01); *G06T 2200/28* (2013.01)

(58) Field of Classification Search
CPC ......... G06T 15/00–87; G06T 17/00–30; G06T 19/00–20
See application file for complete search history.

(56) References Cited

U.S. PATENT DOCUMENTS

| | | | | |
|---|---|---|---|---|
| 6,148,437 A * | 11/2000 | Shah | ................... | G06F 9/45525 717/128 |
| 6,795,963 B1 * | 9/2004 | Andersen | ............ | G06F 11/3628 714/E11.209 |
| 2006/0005178 A1 * | 1/2006 | Kilgard | ................... | G06F 8/443 717/153 |
| 2006/0225061 A1 * | 10/2006 | Ludwig | ................... | G06F 8/441 717/161 |
| 2009/0073168 A1 * | 3/2009 | Jiao | ........................ | G06T 15/005 345/426 |
| 2011/0154307 A1 * | 6/2011 | Upton | ..................... | G06T 11/40 717/146 |
| 2014/0354669 A1 * | 12/2014 | Galazin | ................. | G06T 11/001 345/582 |

* cited by examiner

*Primary Examiner* — Daniel F Hajnik (57) ABSTRACT

Techniques to patch a shader program after the shader has been compiled and/or while the shader is in an execution pipeline are described. The shader may be patched based on references to global constants in a global constant buffer. For example, the reference to the global constant buffer may be patched with the value of the global constant, conditional statements based on references to the global constant buffer may be replaced with unconditional statements based on the value of the global constant in the global constant buffer, to optimize the shader or increase computational efficiency of the shader.

24 Claims, 9 Drawing Sheets

PATCHED SHADER
156

OPTIMIZED TRANSFORMATION MATRIX
510 dp4 o0.x___, r0.xyzw, <value of cb0[0]>.xyzw
dp4 o0._y__, r0.xyzw, <value of cb0[1]>.xyzw
dp4 o0.__z_, r0.xyzw, <value of cb0[2]>.xyzw
dp4 o0.___w, r0.xyzw, <value of cb0[3]>.xyzw

*FIG. 5B*

SHADER
152

TRANSFORMATION MATRIX
500 dp4 o0.x___, r0.xyzw, cb0[0].xyzw
dp4 o0._y__, r0.xyzw, cb0[1].xyzw
dp4 o0.__z_, r0.xyzw, cb0[2].xyzw
dp4 o0.___w, r0.xyzw, cb0[3].xyzw

DYNAMIC KERNEL MODIFICATION FOR GRAPHICS PROCESSING UNITS

CROSS-REFERENCE TO RELATED APPLICATIONS

This application is a continuation of, claims the benefit of and priority to previously filed U.S. patent application Ser. No. 14/572,597 filed Dec. 16, 2014, entitled "Dynamic Kernel Modification For Graphics Processing Units", which is hereby incorporated by reference in its entirety.

BACKGROUND

Modern computer graphics are rendered using a shader or a kernel. In general, the shader (or kernel) is used to determine levels of color within an image, produce special effects, and apply post-processing operations. A shader typically is programmed to operate using a shading language and can be coded for a particular graphics processor. Such shading languages are often used to program a pipeline that allows for customized effects. For example, the position, hue, saturation, brightness, and contrast of all pixels, vertices, and textures used to construct a final image can be altered dynamically, using algorithms defined in the shader.

In general, there are a number of types of shaders. The various shaders can reference constants that may be used to affect the behavior of the shader. For example, a shader program can use, a local constant and a global constant. Local constants are defined the shader and cannot change while global constants can be changed by the application any time before executing the shader. Many modern computer applications (e.g., games, desktop managers, or the like) use global constants to control various settings (e.g., 3D settings, visual quality, lighting effects, resolution, size of depth buffer, number of samples per MSAA, or the like). Such settings cannot change during shader execution. However, since the application can change global constants any time before the shader execution, the value often unknown when the shader is compiled. As such, the shader compiler cannot fully optimize the shader based on the value of the global constants. As a result, the overall performance of the shader may decrease while memory pressure and power consumption of the shader may increase. Furthermore, any change to the shader itself using conventional pipelines requires the shader to be recompiled, which further reduces efficiency. It is with respect to the above, that the present disclosure is provided.

DETAILED DESCRIPTION

Various embodiments are generally directed to techniques to "patch" a graphics processing unit (GPU) shader after the shader has been compiled. More specifically, the present disclosure provides that a shader that is to be executed by a graphics processor can be patched while the shader is in the execution pipeline. Said differently, the present disclosure provides techniques to optimize a shader while the shader is in the pipeline but before the shader is executed in the GPU (or between subsequent executions of the shader). With some examples, the shader is patched when any one of the global constants referenced in the shader is modified.

It is to be appreciated, that the present disclosure can be applied to various shaders, such as, graphics shaders, compute shaders, etc. Furthermore, the present disclosure can be applied to patch a shader while in either a compute or a graphics pipeline. Additionally, it is noted, that although reference herein is made to shaders, the present disclosure can be applied to patch a kernel. Accordingly, although reference is made herein to graphics shaders, GPU shaders, etc., it is to be appreciated that this is done for purposes of clarity and explanation and not intended to be limiting to only graphics shaders.

In general, the present disclosure may be applied to optimize a shader after the shader has been compiled. In particular, the present disclosure can be applied to optimize a shader for purposes of power efficiency. With some examples, the present disclosure can be applied to optimize a shader for purposes of increasing, maximizing, or otherwise optimizing performance. For example, the present disclosure can be applied to cap frame rates to increase power efficiency or to uncap frame rates to increase performance.

For example, with modern computer graphics application programming interfaces (e.g., DirectX, OpenGL, or the like) an application passes certain data (e.g., camera position, lighting preferences, display preferences, hardware acceleration parameters, shader parameters, or the like) through global constant buffers, which are referenced in the GPU shader as fetches from a global constant buffer. Some of these global constants used to make control flow decisions within the GPU shader. As will be appreciated, these control flow decisions potentially affect parallelism and impact performance in the GPU. However, since the data in the global constant buffer does not change throughout execution of the shader, and sometimes throughout execution of the entire application (e.g., game settings, application display settings, or the like) the value of the global constants are "patched" directly into the GPU shader before the shader is executed in the GPU.

In some examples, the shader patching may only occur when constants referenced in the GPU shader are modified before executing the patched shader. In other examples, the existing patched shader can be used.

In some examples, a GPU shader may be patched based on the instruction type (e.g., Multi-sample Anti-aliasing enabled, or the like), shader type (e.g., pixel shader, or the like), based on the rate at which the referenced constants are updated, or in general, any parameter to limit the number of times the GPU shader is patched.

As such, the present disclosure provides for optimizing the GPU shader using the execution pipeline before the GPU shader is executed in the GPU. Therefore, the present disclosure provides techniques that may improve performance by, for example, removing unnecessary memory fetches, data dependencies and/or control flows in the GPU shader.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 1:
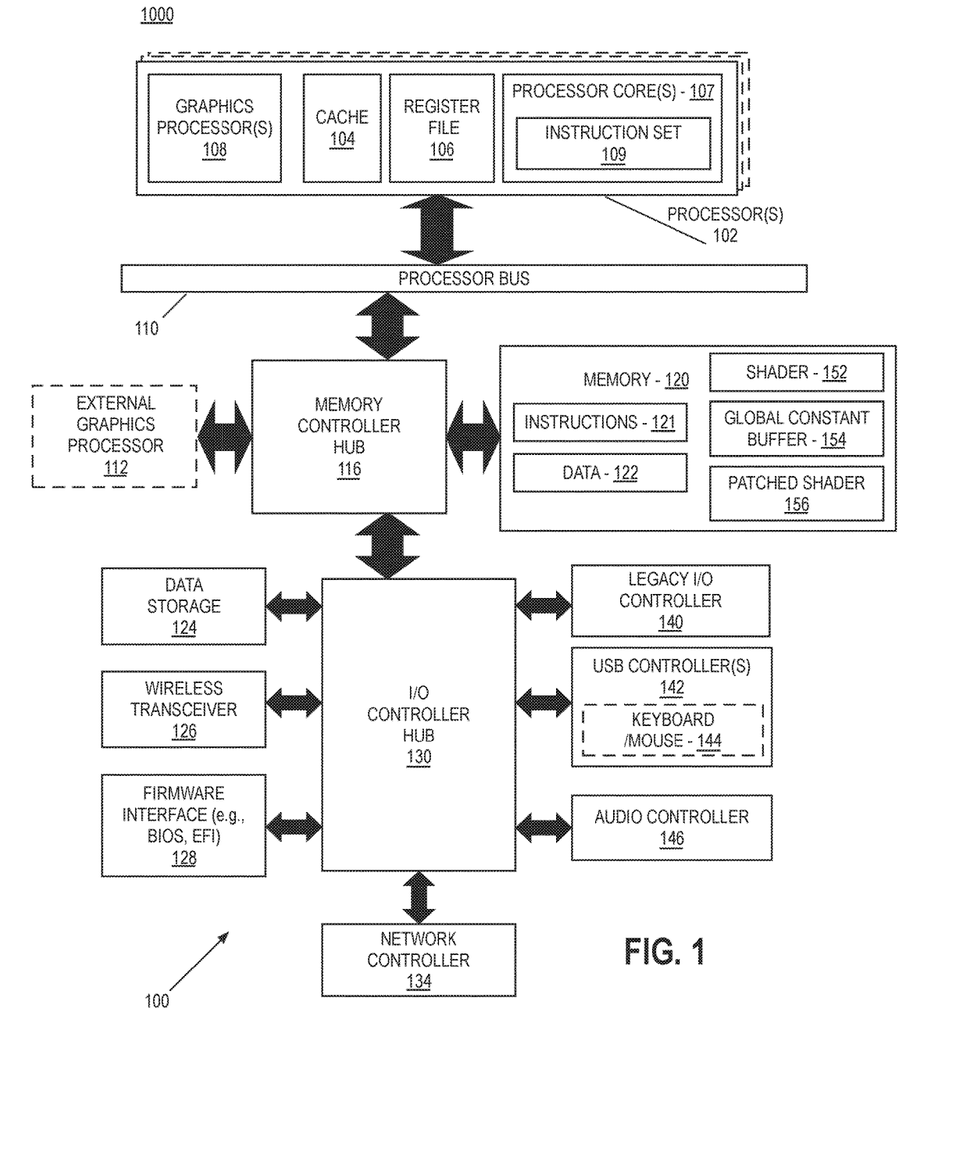
FIG. 1 illustrates an embodiment of a shader optimization system.

FIG. 1 is a block diagram of a shader optimization system 100, according to an embodiment. In general, the shader optimization system 100 is configured to optimize a shader program for execution by a GPU after the shader program has been compiled and/or added to an execution pipeline. The shader optimization system 100 includes one or more processors 102 and one or more graphics processors 108, and may be a single processor desktop system, a multiprocessor workstation system, or a server system having a large number of processors 102 or processor cores 107. In on embodiment, the shader optimization system 100 is a system on a chip integrated circuit (SOC) for use in mobile, handheld, or embedded devices.

An embodiment of the shader optimization system 100 can include, or be incorporated within a server-based gaming platform, a game console, including a game and media console, a mobile gaming console, a handheld game console, or an online game console. In one embodiment, the shader optimization system 100 is a mobile phone, smart phone, tablet computing device or mobile Internet device. The shader optimization system 100 can also include, couple with, or be integrated within a wearable device, such as a smart watch wearable device, smart eyewear device, augmented reality device, or virtual reality device. In one embodiment, the shader optimization system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor 107 may each process a different instruction set 109 that may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) that may be shared among the processor cores 107 using known cache coherency techniques. A register file 106 is additionally included in the processor 102 which may include different types of registers for storing different types of data integer registers, floating point registers, status registers, and an instruction pointer register). Some registers may be general-purpose registers, while other egisters may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory controller hub 116 also couples with an optional external graphics processor 112, which may communicate with the one or more graphics processors 108 in the processors 102 to perform graphics and media operations. The memory 120 can store data 122 and instructions 121 for use when the processor 102 executes a process. The instructions 121 can be a sequence of instructions operative on the processors 102 and/or the external graphics processor 112 to implement logic to perform various functions.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

In various embodiments, the memory 120 stores (e.g., as data 122) one or more of a shader 152, a global constant buffer 154, and a patched shader 156. In executing the instructions 121, the processor 102 receives the shader 152. In some examples, the system 100 (e.g., the processor 102) may compile the shader 152. With some examples, the shader 152 may be complied on another system (not shown) and communicated to the system 100 (e.g., via the network controller 134, or the like).

In some examples, the system 100 may use a pipeline (e.g., refer to FIGS. 2, 8, and 9) to process the shader 152. As such, the shader 152 may be patched (resulting in the patched shader 156) while the shader 152 is in the pipeline. In executing the instructions 121, the processor 102 and/or the external graphics processor 112 further determine whether portions of the shader 152 can be optimized and either (1) patches the shader 152 based on the determination that portions of the shader 152 can be optimized, resulting in the patched shader 156; or (2) does not patch the shader 152 based on the determination that portions of the shader 152 cannot be optimized.

In general, the processor 102 and/or the external graphics processor 112 generates the patched shader 156 by replacing portions of the shader 152 with one or more optimized portions. In general, the shader 152 is patched after it has been compiled. With some examples, the shader 152 may be patched while the shader 152 is in a pipeline. In some examples, the shader 152 is patched after it has been executed. As such, the patched shader 156 may be used on subsequent executions (e.g., draw calls, or the like).

In some implementations, the processor 102 and/or the external graphics processor 112 may determine whether portions of the shader 152 can be optimized based on the global constant buffer 154. In particular, based on whether global constants referenced in the shader 152 have corresponding values in the global constant buffer 154. The processor 102 and/or the external graphics processor 112 may replace the reference to the global constant in the shader 152 with the value of the global constant from the global constant buffer 154, resulting in the patched shader 156. This concept is explained in greater detail below with reference to FIGS. 5A-5B.

With some examples, the processor 102 and/or the graphics processor component 212 may determine whether portions of the shader 152 can be optimized based on whether global constants referenced by conditional statements in the shader 152 have corresponding values in the global constant buffer 154. The processor 102 and/or the external graphics processor 212 may replace the conditional statement n the shader 152 based on the original conditional and the value of the global constant from the global constant buffer 154, resulting in the patched shader 156. This concept is explained in greater detail below with reference to FIGS. 6A-6C.

Figure 2:
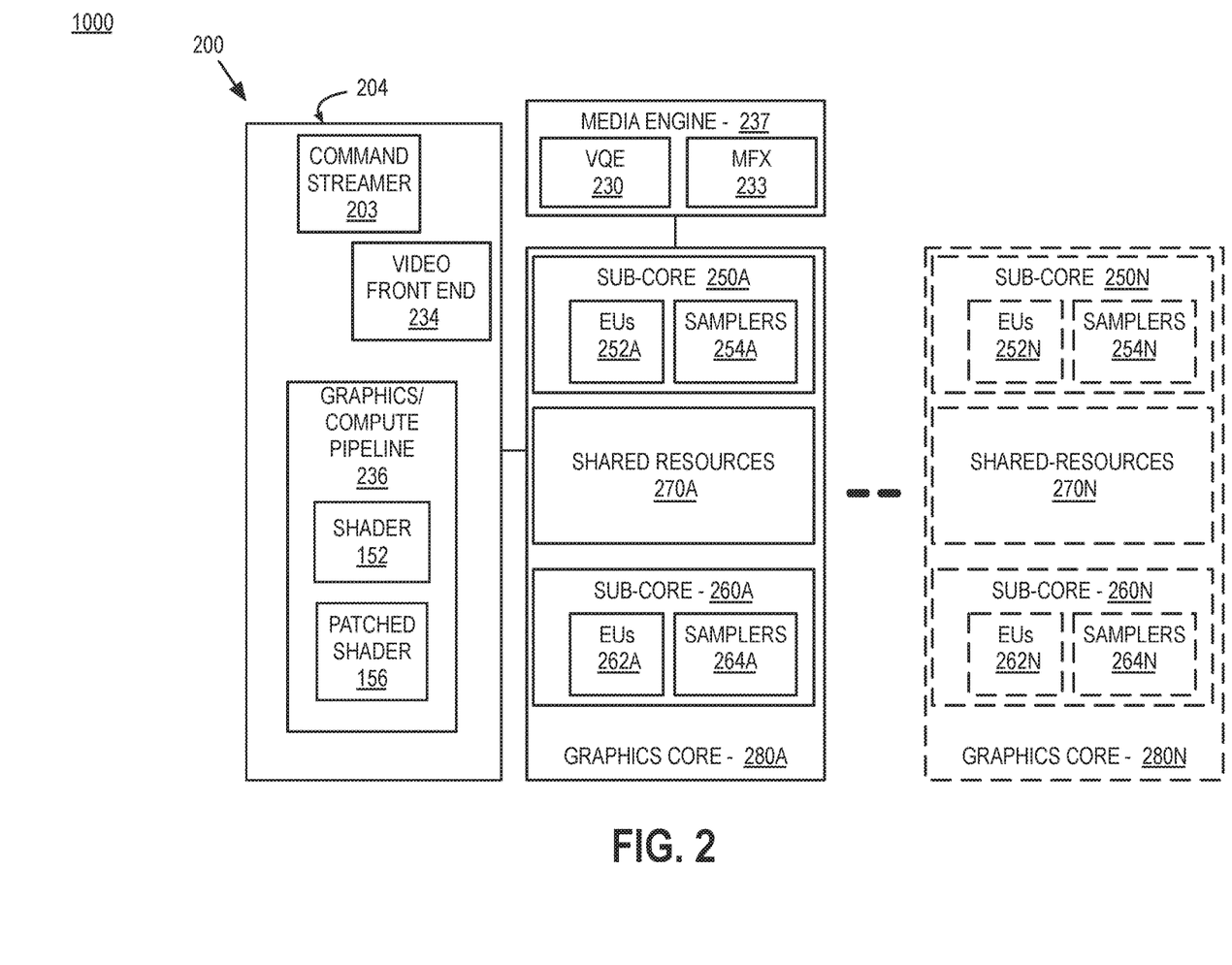
FIG. 2 illustrates an embodiment of a graphics processor that can be implemented in the system of FIG. 1.

FIG. 2 is a block diagram of an embodiment of a graphics processor 200, such as, for example, the graphics processor 108 and/or the external graphics processor 112. In one embodiment, the graphics processor 200 includes a pipeline front-end 204, a media engine 237, and graphics cores 280A-N. In one embodiment, the graphics processor 200 is one of many processors integrated within a multi-core processing system (e.g., as depicted in FIG. 1).

The graphics processor 200 receives batches of commands and a command streamer 203 interprets the incoming commands in the pipeline front-end 204. The graphics processor 200 includes scalable execution logic to perform 3D geometry processing and media processing via the graphics core(s) 280A-N. For 3D geometry processing commands, the command streamer 203 supplies the commands to the graphics/compute pipeline 236. During such processing, the graphics processor 200 is configured to patch a shader (e.g., refer to FIG. 3) while the shader is in the graphics/compute pipeline 236. For example, the shader 152 and the patched shader 156 are depicted in the graphics/compute pipeline 236.

For at least some media processing commands, the command streamer 203 supplies the commands to a video front end 234, which couples with a media engine 237. The media engine 237 includes a video quality engine (VQE) 230 for video and image post processing and a multi-format encode/decode (MFX) 233 engine to provide hardware-accelerated media data encode and decode. The graphics/compute pipeline 236 and media engine 237 each generate execution threads for the thread execution resources provided by at least one graphics core 280A.

The graphics processor includes scalable thread execution resources featuring modular cores 280A-N (sometime referred to as core slices), each having multiple sub-cores 250A-N, 260A-N (sometimes referred to as core sub-slices). The graphics processor can have any number of graphics cores 280A through 280N. It is noted, that the pipeline front end 204, and particularly, the graphics/compute pipeline 236 as well as the media end 237 executes on the modular cores 280A-N. More specifically, the EUs 252A-N within each of the modular cores 280A-N execute the graphics/compute pipeline (e.g., execute the shader 152, the patches shader 156, or the like).

In one embodiment, the graphics processor includes a graphics core 280A having at least a first sub-core 250A and a second core sub-core 260A. In another embodiment, the graphics processor is a low power processor with a single sub-core (e.g., 250A). In one embodiment, the graphics processor includes multiple graphics cores 280A-N, each including a set of first sub-cores 250A-N and a set of second sub-cores 260A-N. Each sub-core in the set of first sub-cores 250A-N includes at least a first set of execution units 252A-N and media/texture samplers 254A-N. Each sub-core in the set of second sub-cores 260A-N includes at least a second set of execution units 262A-N and samplers 264A-N. In one embodiment, each sub-core 250A-N, 260A-N shares a set of shared resources 270A-N. In one embodiment, the shared resources include shared cache memory and pixel operation logic. Other shared resources may also be included in the various embodiments of the graphics processor.

Figure 3:
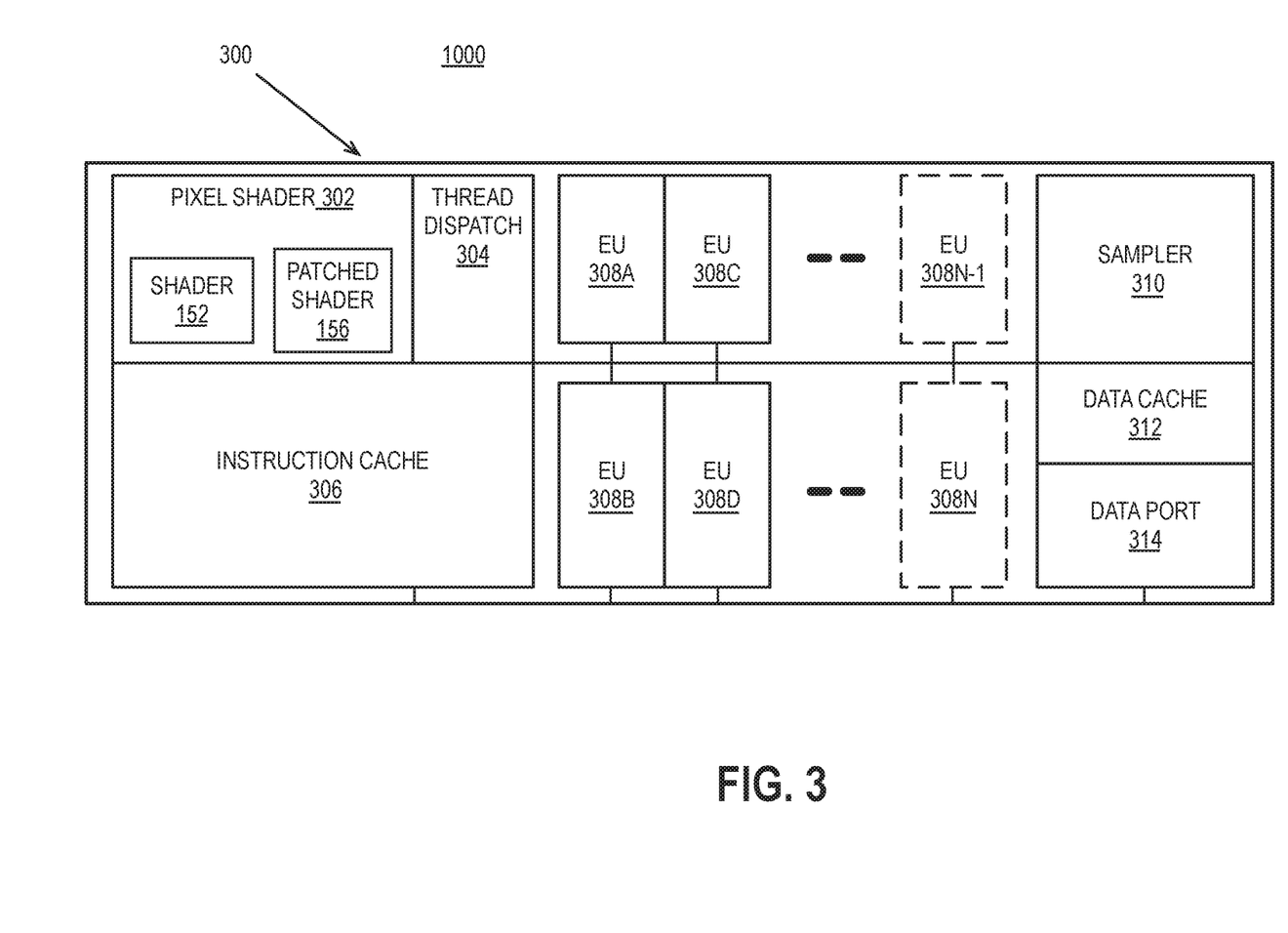
FIG. 3 illustrates an embodiment of thread execution logic of the graphics processor of FIG. 2.

FIG. 3 illustrates thread execution 300 including an array of processing elements employed in one embodiment of a shader optimization system including a graphic processor (e.g., the system 100 of FIG. 1). In one embodiment, the thread execution logic 300 includes a pixel shader 302 (e g the shader 152, the patched shader 156, or the like), a thread dispatcher 304, instruction cache 306, a scalable execution array including a plurality of execution units 308A-N, a sampler 310, a data cache 312, and a data port 314. In one embodiment the included components are interconnected via an interconnect fabric that links to each of the components. The thread execution logic 300 includes one or more connections to memory, such as system memory 120 or cache memory 104, through one or more of the instruction cache 306, the data port 314, the sampler 310, and the execution unit array 308A-N. In one embodiment, each execution unit (e.g. 308A) is an individual vector processor capable of executing multiple simultaneous threads and processing multiple data elements in parallel for each thread. The execution unit array 308A-N includes any number individual execution units.

In one embodiment, the execution unit array 308A-N is primarily used to execute "shader" programs (e.g., the shader 152, the patched shader 156, or the like). In one embodiment, the execution units in the array 308A-N execute an instruction set that includes native supportfor many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 308A-N operates on arrays of data elements. The number of data elements is the "execution size," or the number of channels for the instruction. An execution channel is a logical unit execution for data element access, masking, and flow control within instructions. The number of channels may be independent of the number of physical ALUs or FPUs for a particular graphics processor. The execution units 308A-N support integer and floating-point data types.

The execution unit instruction set includes single instruction multiple data (SIMD) instructions. The various data elements can be stored as a packed data type in a register and the executionunit will process the various elements based on the data size of the elements. For example, when operating on a 256-bit wide vector, the 256 bits of the vector are stored in a register and the execution unit operates on the vector as four seperate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register are possible.

One or more internal instruction caches (e.g., the instruction cache 306) are included in the thread execution logic 300 to cache thread instructions for the execution units. In one embodiment, one or more data caches (e.g., 312) are included to cache thread data during thread execution. A sampler 310 is included to provide texture sampling for 3D operations and media sampling for media operations. In one embodiment, the sampler 310 includes specialized texture or media sampling functionality to process texture or media data during the sampling process before providing the sampled data to an execution unit.

During execution, the graph and/or compute pipelines send thread initiation requests to the thread execution logic 300 via thread spawning and dispatch logic. The thread execution logic 300 includes a local thread dispatcher 304 that arbitrates thread initiation requests from the graphics and/or compute pipelines and instantiates the requested threads on one or more execution units 308A-N. For example, the graphics/compute pipeline (e.g., 236 of FIG. 2) dispatches vertex processing, tessellation, or geometry processing threads to the thread execution logic 300. The thread dispatcher 304 can also process runtime thread spawning requests from the executing shader programs.

Once a group of geometric objects have been processed and rasterized into pixel data, the pixel shader 302 is invoked to further compute output information and cause results to be written to output surfaces (e.g., color buffers, depth buffers, stencil buffers, etc.). In one embodiment, the pixel shader 302 calculates the values of the various vertex attributes that are to be interpolated across the rasterized object. The pixel shader 302 then executes an API-supplied pixel shader program (e.g., the shader 152, the patched shader 156, or the like). To execute the pixel shader program, the pixel shader 302 dispatches threads to an execution unit (e.g., 308A) via the thread dispatcher 304. The pixel shader 302 uses texture sampling logic in the sampler 310 to access texture data in texture maps stored in memory. Arithmetic operations on the texture data and the input geometry data compute pixel color data for each geometric fragment, or discards one or more pixels from further processing.

In one embodiment, the data port 314 provides a memory access mechanism for the thread execution logic 300 output processed data to memory for processing on a graphics processor output pipeline. In one embodiment, the data port 314 includes or couples to one or more cache memories (e.g., data cache 312) to cache data for memory access via the data port.

Figure 4:
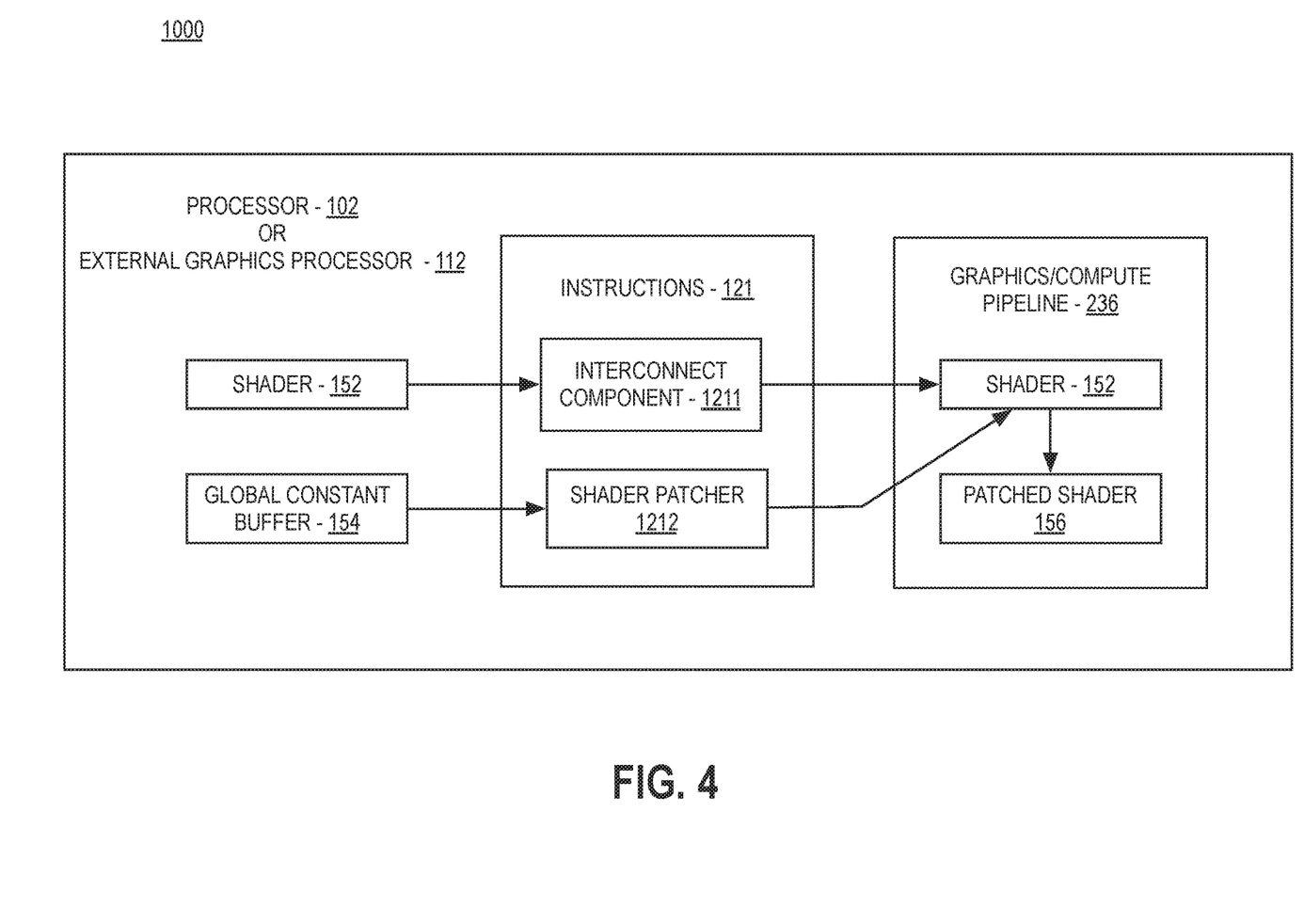
FIG. 4 illustrates a portion of the system of FIG. 1.

FIG. 4 is a block diagram of a portion of an embodiment of the system 100 of FIG. 1. In general, FIG. 4 illustrates aspects of the operation of the system 100, and in particular, illustrates an embodiment of the system 100 configured to execute the instructions 121 and patch the shader 152 to generate the patched shader 156. In various embodiments, the instructions 121 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor 102 (including the graphics processor 108) and/or external graphics processor 112. Where one or more device drivers are included, those device drivers may provide support for any of a variety of other components, whether hardware or software components, of the system 100 and/or the graphics processor 200. In some examples, the instructions 121

In various embodiments, the instructions 121 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor 102 and/or external graphics processor 112. Where one or more device drivers are included, those device drivers may provide support for any of a variety of other components, whether hardware or software components, of the system 100, processor 102, and/or external graphics processor 112.

The instructions 121 may include an interconnect component 1211 (e.g., the ring interconnect 202, or the like) and a shader patcher 1212. The interconnect component 1211 receives the shader 152 for execution by a graphics processor (e.g., GPU, EU, or the like). The interconnect component 1211 may add the shader 152 to an execution pipeline (e.g., the graphics/compute pipeline 236, or the like).

The shader patcher 1212 determines whether one or more portions of the shader 152 can be optimized and patches the shader 152 based on the determination that one or more portions of the shader 152 can be optimized. In particular, the shader patcher 1212 generates the patched shader 156.

In some examples, the shader patcher 1212 replaces (e.g., "patches") portions of the shader 152 with the actual values or with optimized statements or functions, after the shader 152 has been compiled and/or while the shader 152 is in the pipeline. In some examples, the shader patcher 1212 takes the global constant buffer 154 referenced in the shader 152 as input.

Figure 5A:
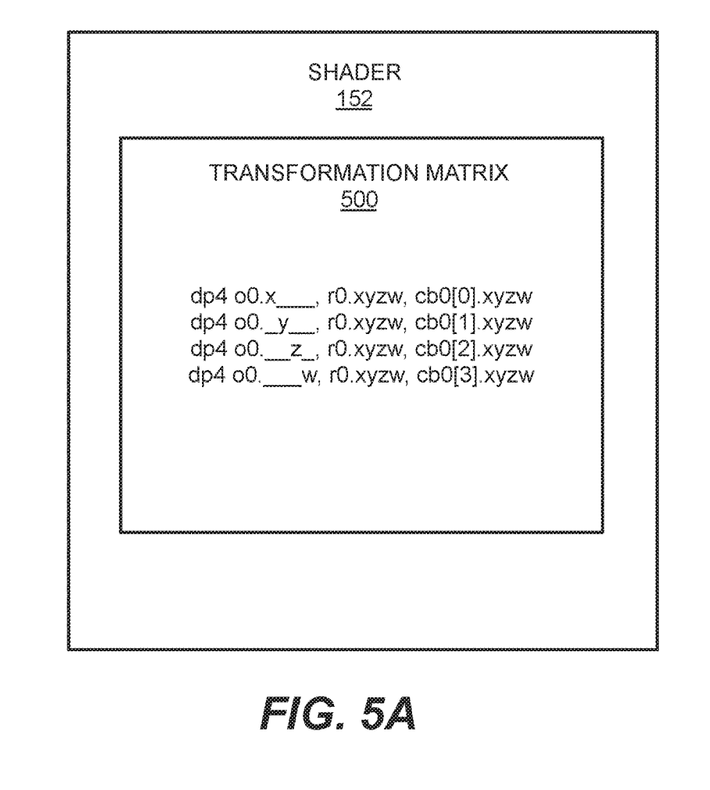
FIGS. 5A-5B illustrates an example of a shader and a corresponding patched shader.
Figure 5B:
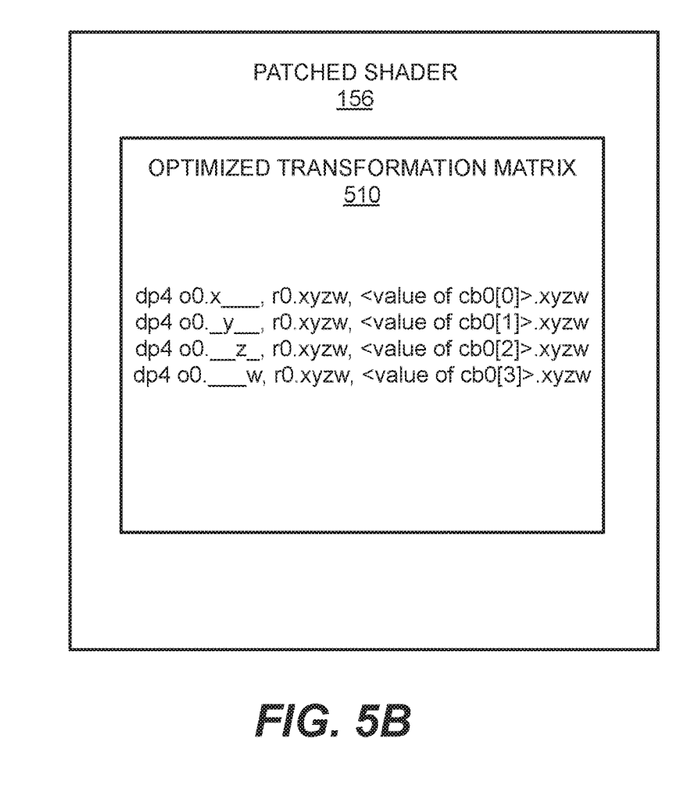

FIGS. 5A-5B and 6A-6C illustrate example implementations of a shader 152 and a corresponding patched shader 156. In particular, FIG. 5A illustrates an example implementation of the shader 152 having a transformation matrix 500 including the 4 vector constants cb0[0] to cb0[3] while FIG. 5B illustrates a corresponding patched shader 156 where the reference to the constant fetches has been placed with the actual values from the global constant buffer 154. In particular, as depicted, the transformation matrix 500 has been replaced with an optimized transformation matrix 510, that incudes the actual values of the constants cb0[0] to cb0[3]. As such, when the patched shader 156 is processed executed (e.g., by the device 100, by the graphics processor 200, or the like), the patched shader 156 will require less resources (e.g., memory bandwidth, compute cycles, or the like) to execute.

Figure 6A:
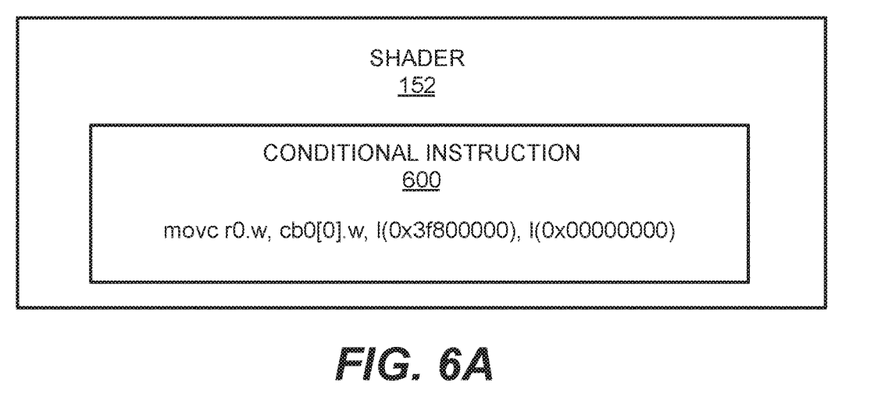
FIGS. 6A-6C illustrates an example of a shader and corresponding patched shaders.
Figure 6B:
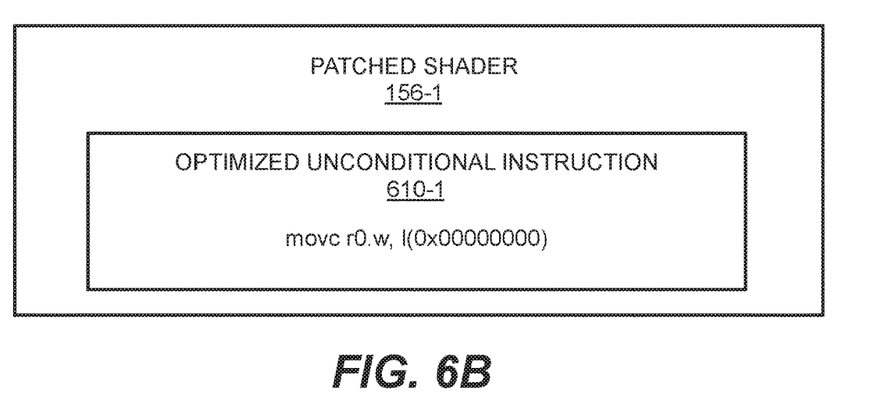
Figure 6C:
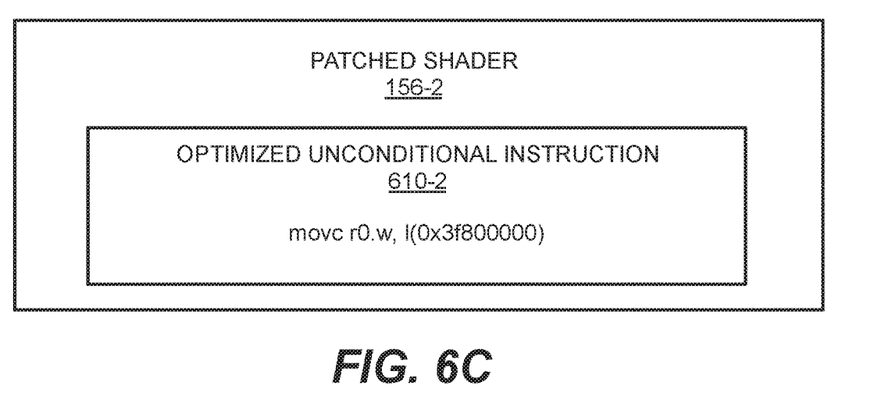

Turning more specifically to FIG. 6A, an example implementation of the shader 152 having a conditional instruction 600 including the conditional mov instruction based on the value of cb0[0].w from the global constant buffer 154. FIGS. 6B and 6C illustrate example patched shaders 156 (e.g., 156-1 and 156-2) where the conditional instruction 600 is replaced with an unconditional instruction (e.g., 610-1 and 610-2).

Figure 7:
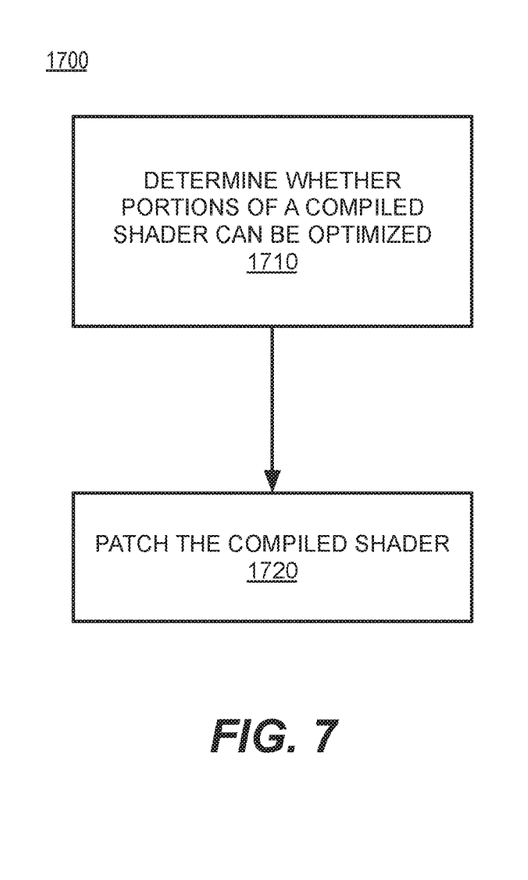
FIGS. 7-8 illustrate examples of logic flows according to embodiments.
Figure 8:
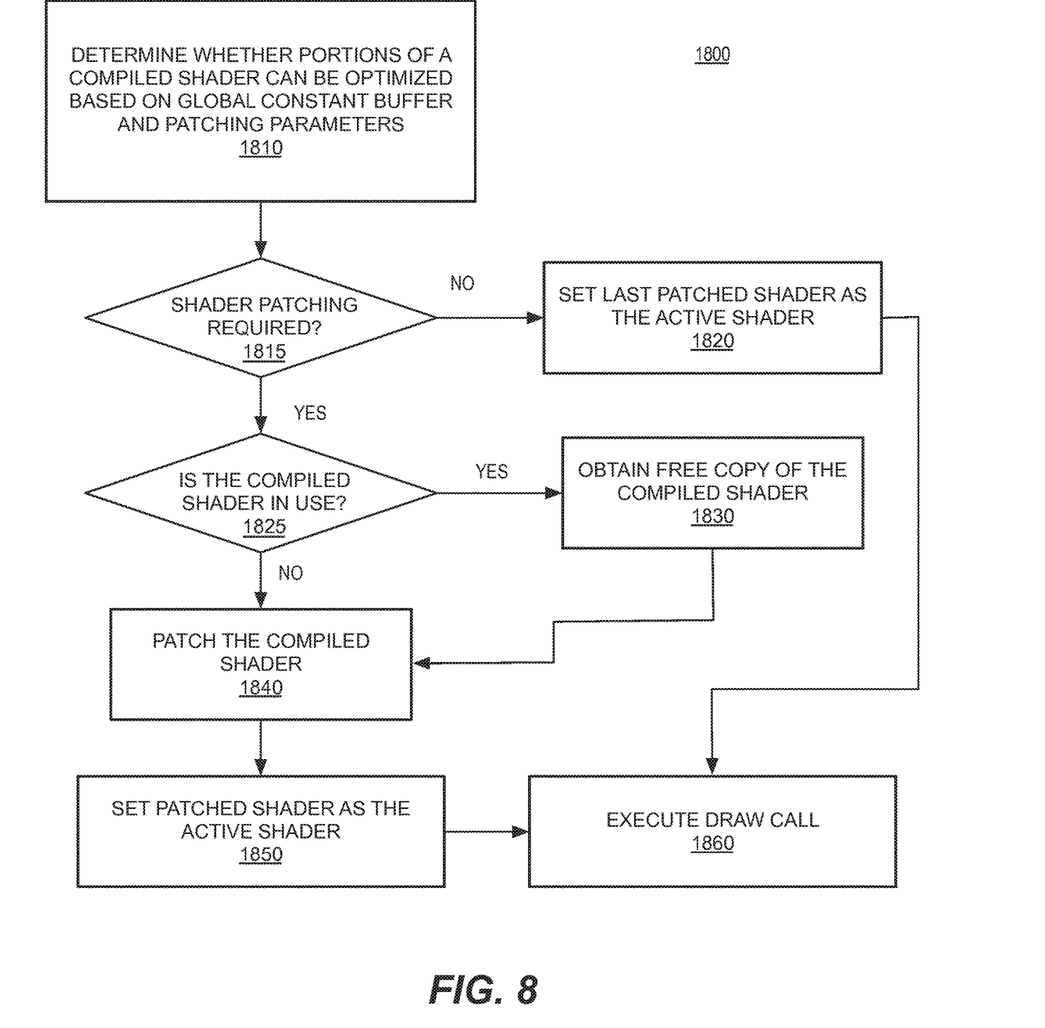

FIGS. 7-8 illustrate embodiments of logic flows that may be implemented by components of the system 1000. The illustrated logic flows may be representative cif some or all of the operations executed by one or more embodiments described herein. More specifically, the logic flows may illustrate operations performed by the processor 102 (including the graphics processor 108) and/or the external graphics processor 112 in executing at least the instructions 121.

In general, FIG. 7 illustrates alogic flow 1700 that may be implemented to patch a shader as described herein while FIG. 8 illustrates a logic flow 1800 that may be implemented to patch a shader based on one or more patching parameters as described herein.

Turning more specifically to FIG. 7, the logic flow 1700 may begin at block 1710. At block 1710, a processor (e.g., the processor 102, the graphics processor 108, or the external graphics processor 112, or the like) determines whether portions of a compiled shader can be optimized. For example, the shader patcher 1212 may determine whether portions of the shader 152 can be optimized.

Continuing to block 1720, the processor patches the compiled shader. For example, the shader patcher 1212 may patch the shader 152, resulting in the patched shader 156.

Turning more specifically to FIG. 8, the logic flow 1800 may begin at block 1810. At block 1810, a processor (e.g., the processor 102, the graphics processor 108, or the external graphics processor 112, or the like) determines whether portions of a compiled shader can be optimized based on a global constant buffer and one or more patching parameters. For example, the shader patcher 1212 may determine whether portions of the shader 152 can be optimized based on the global constant buffer 154 and a patching parameter. In particular, the shader patcher 1212 may determine to patch the shader 152 based on identifying one or more specific instruction types in the shader (e.g., conditional instructions, or the like). As another example, the shader patcher 1212 may determine to patch the shader 152 based on a global setting of the application to which the shader corresponds being changed (e.g., lighting setting, fog setting, anti-aliasing setting, display setting, or the like). As another example, the shader patcher 1212 may determine to patch the shader 152 based on values within the global constant buffer 154 changing and/or based on a specific time passing since values within the global constant buffer 154 changed.

Continuing to decision block 1815, the processor determines whether the shader patching is required based on the determination of whether portion of the compiled shader can be optimized from block 1810. The flow may continue to either decision block 1825 or block 1820. In particular, if shader patching is required (e.g., the shader can be optimized as determined at block 1810) then the flow can continue to decision block 1825. However, if shader patching is not required (e.g., the shader cannot be optimized as determined at block 1810) then the flow may continue to block 1820. At block 1820, the last patched shader is set as the "active" shader. As such, upon execution of a draw call (e.g., block 1860) the last patched shader will be executed.

At decision block 1825, the processor determines whether the compiled shader is in use (e.g., currently being executed, or the like). The flow may continue to either block 1830 or block 1840. In particular, if the shader is in use, the flow may continue to block 1830. At block 1830, the processor may obtain a free version or copy of the compiled shader. More specifically, the processor may obtain a copy of the compiled shader, which is not currently being executed in an EU of a GPU. From block 1830, the flow may continue to block 1840.

At block 1840, the processor patches the compiled shader. For example, the shader patches 1212 may patch the shader 152, resulting in the patched shader 156. Continuing to block 1830, the processor determines whether the shader 152 has been executed. For example, the processor may determine thether a draw call referencing the shader 152 has been executed.

Continuing to block 1850, the processor component sets the patched shader 156 as the "active" shader. As such, upon subsequent draw call, the patched shader 156 may be executed. Continuing to block 1860, the processor executes a draw call. More specifically, the processor causes the active shade (e.g., the shader patched at block 1840 or the last patched shader as specified at block 1820) to be executed by an EU of the GPU.

Figure 9:
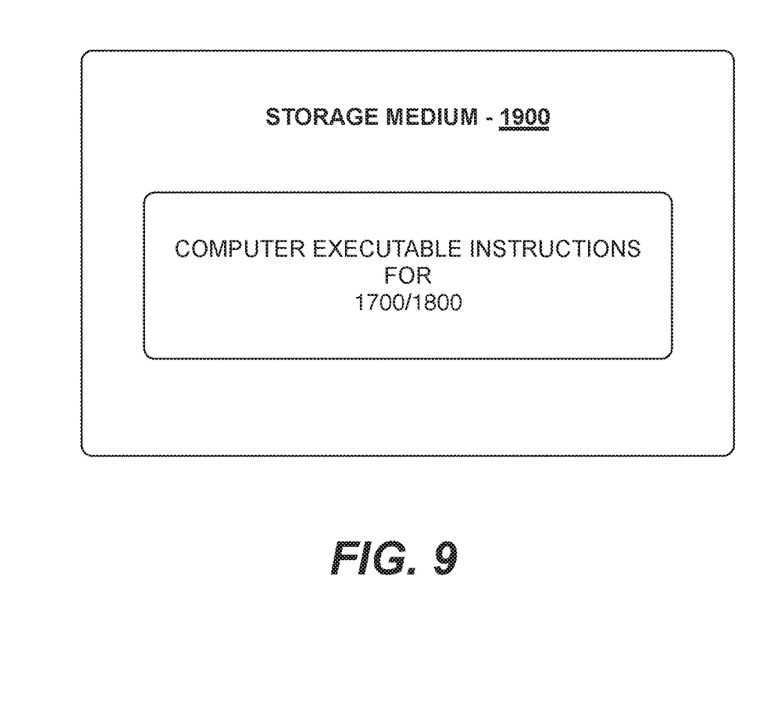
FIG. 9 illustrates a storage medium according to an embodiment.

FIG. 9 illustrates an embodiment of a storage medium 1900. The storage medium 1900 may comprise an article of manufacture. In some examples, the storage medium 1900 may include any non-transitory computer readable medium or machine readable medium, such as an optical, magnetic or semiconductor storage. The storage 1900 may store various types of computer executable instructions, such as instructions to implement logic flows 1700, and/or 1800. Examples of a computer readable or machine readable storage medium may include any tangible media capable of storing electronic data, including volatile memory or non-volatile memory, removable or non-removable memory, erasable or non-erasable memory, writeable or re-wroteable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
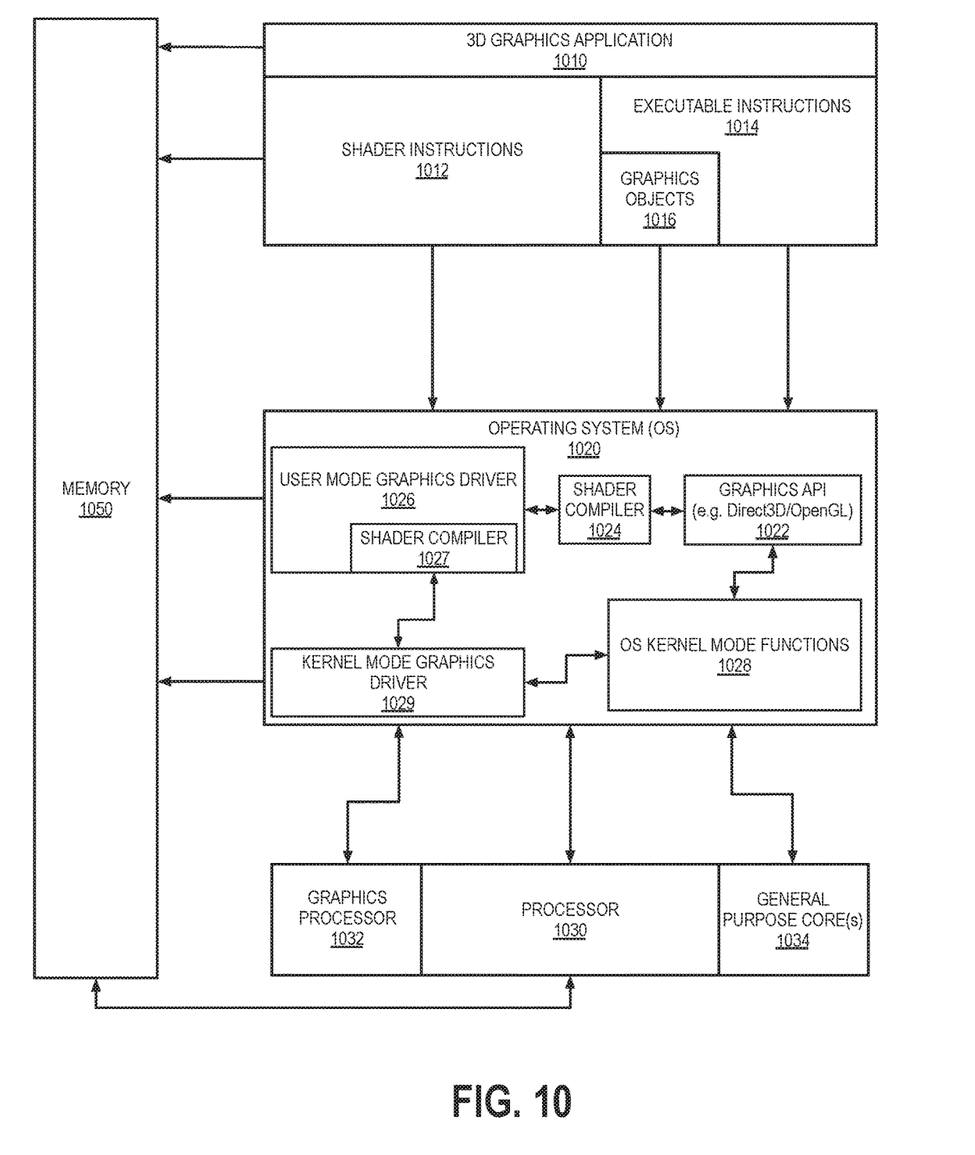
FIG. 10 illustrates graphics software architecture according to an embodiment.

FIG. 10 illustrates exemplary graphics software architecture 3000 for a data processing system according to an embodiment. The graphics software architecture 3000 may be implemented to patch a shader as described herein. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012 (e.g., the instructions from which the shader 152 is compiled, or the like). The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-intime compilation or the application can perform share precompilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not ecessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination components and/or methodologues, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus to optimize a graphics processing unit (GPU) pipeline comprising: a graphics processing unit (GPU) interconnect to receive a compiled shader; and a shader patcher to determine whether one or more portions of the compiled shader can be patched, to generate one or more patched portions based on an optimization goal, and to replace the one or more portions of the compiled shader with the one or more patched portions based on the determination that the one or more portions of the shader can be patched.

Example 2

The apparatus of example 1, wherein the optimization goal comprises increasing power efficiency, increasing computational power, or reducing memory fetches.

Example 3

The apparatus of example 1, the kernel patcher to determine whether one or more portions of the compiled shader can be patched based on a global constant buffer.

Example 4

The apparatus of example 3, the kernel patcher to determine whether one or more global constants referenced in the compiled shader have corresponding values in the global constant buffer.

Example 5

The apparatus of example 4, the kernel patcher to replace the reference to the global constant in the compiled shader with the value of the global constant from the global constant buffer.

Example 6

The apparatus of example 1, the kernel patcher to: identify one or more conditional statements in the compiled shader; and determine whether one or more portions of the compiled shader can be patched based on the identified conditional statements.

Example 7

The apparatus of example 6, the kernel patcher to replace the one or more identified conditional statements with one or more unconditional statements.

Example 8

The apparatus of example 7, wherein the one or more unconditional statements correspond to values of one or more global constants from a global constant buffer.

Example 9

The apparatus of any one of examples 1 to 8, comprising a GPU operably coupled to the GPU interconnect, the GPU to repeatedly execute the compiled shader, the shades patcher to patch the compiled shader between a first instance the GPU executes the compiled shader and a second instance the GPU executes the compiled shader.

Example 10

The apparatus of any one of example 9, further including a display operably coupled to the GPU to illuminate one or more pixels based on output from the GPU.

Example 11

The apparatus of any one of examples 1 to 8, the compiled shader comprising a graphics shader, a compute shader, or a kernel.

Example 12

The apparatus of any one of examples 1 to 8, the shader patcher to patch the compiled shader while the compiled shader is in a pipeline, the pipeline comprising a graphics pipeline or a compute pipeline.

Example 13

The apparatus of any one of examples 1 to 8, the shader patcher to patch the compiled shader based in part on a patching parameter.

Example 14

The apparatus of example 13, wherein the patching parameter comprises a type of shader, an instruction type, or a frequency with which a value in the global constant buffer changes.

Example 15

A computing-implemented method for managing a shader to be executed by a GPU comprising: determining whether one or more portions of a compiled shader can be patched; generating one or more patched portions based on an optimization goal; and replacing the one or more portions of the compiled shader with the one or more patched portions based on the determination that the one or more portions of the compiled shader can be patched.

Example 16

The computing-implemented method of example 15, wherein the optimization goal comprises increasing power efficiency, increasing computational power, or reducing memory fetches.

Example 17

The computing-implemented method of example 15, comprising determining whether one or more portions of the compiled shader can be patched based on a global constant buffer.

Example 18

The computing-implemented method of example 17, comprising determining whether one or more global constants referenced in the compiled shader have corresponding values in the global constant buffer.

Example 19

The computing-implemented method of example 18, comprising replacing the reference to the global constant in the compiled shader with the value of the global constant from the global constant buffer.

Example 20

The computing-implemented method of example 15, comprising: identifying one or more conditional statements in the compiled shader; and determining whether one or more portions of the compiled shader can be patched based on the identified conditional statements.

Example 21

The computing-implemented method of example 20, comprising replacing the one or more identified conditional statements with one or more unconditional statements.

Example 22

The computing-implemented method of example 21, wherein the one or more unconditional statements correspond to values of one or more global constants from a global constant buffer.

Example 23

The computing-implemented method of any one of examples 15 to 22, comprising patching the compiled shader between a first instance the GPU executes the compiled shader and a second instance the GPU executes the compiled shader.

Example 24

The computing-implemented method of any one of examples 15 to 22, comprising patching the compiled shader based in part on a patching parameter.

Example 25

The computing-implemented method of example 24, wherein the patching parameter comprises a type of shader, an instruction type, or a frequency with which a value in the global constant buffer changes.

Example 26

An apparatus comprising means for performing the method of any of examples 15-25.

Example 27

At least one machine-readable storage medium comprising instructions that when executed by a computing device, cause the computing device to perform the method of any of examples 15-25.

What is claimed is:

1. An apparatus to manage a graphics processing unit (GPU) pipeline comprising:
   a graphics processing unit (GPU) interconnect to receive a compiled shader, the compiled shader to comprise instructions in an executable format that are ready for execution via the GPU pipeline; and
   the GPU pipeline to determine whether one or more portions of the compiled shader can be patched in the executable format, to generate one or more patched portions based on an optimization goal and a global constant buffer, and to replace the one or more portions of the compiled shader with the one or more patched portions based on the determination that the one or more portions of the shader can be patched.

2. The apparatus of claim 1, wherein the optimization goal comprises increasing power efficiency, increasing computational power, or reducing memory fetches.

3. The apparatus of claim 1, the GPU pipeline to determine whether one or more global constants referenced in the compiled shader have corresponding values in the global constant buffer.

4. The apparatus of claim 3, the GPU pipeline to replace the reference to the global constant in the compiled shader with the value of the global constant from the global constant buffer.

5. The apparatus of claim 1, the GPU pipeline to:
   identify one or more conditional statements in the compiled shader; and
   determine whether one or more portions of the compiled shader can be patched based on the identified conditional statements.

6. The apparatus of claim 5, the GPU pipeline to replace the one or more identified conditional statements with one or more unconditional statements.

7. The apparatus of claim 6, wherein the one or more unconditional statements correspond to values of one or more global constants from the global constant buffer.

8. The apparatus of claim 1, comprising a GPU operably coupled to the GPU interconnect, the GPU comprising the GPU pipeline, the GPU to repeatedly execute the compiled shader, the GPU pipeline to patch the shader between a first instance the GPU executes the compiled shader and a second instance the GPU executes the compiled shader.

9. The apparatus of claim 8, further including a display operably coupled to the GPU to illuminate one or more pixels based on output from the GPU.

10. The apparatus of claim 1, the compiled shader comprising a graphics shader, a compute shader, or a kernel.

11. The apparatus of claim 1, the GPU pipeline to patch the compiled shader while the compiled shader is in a pipeline, the pipeline comprising a graphics pipeline or a compute pipeline.

12. The apparatus of claim 1, the GPU pipeline to patch the compiled shader based in part on a patching parameter.

13. The apparatus of claim 12, wherein the patching parameter comprises a type of shader, an instruction type, or a frequency with which a value in the global constant buffer changes.

14. A computing-implemented method for managing a shader to be executed by a GPU comprising:
   determining whether one or more portions of a compiled shader can be patched in an executable format, the compiled shader comprising instructions in the executable format that are ready for execution via a GPU pipeline;
   generating one or more patched portions based on an optimization goal and a global constant buffer; and
   replacing the one or more portions of the compiled shader with the one or more patched portions based on the determination that the one or more portions of the compiled shader can be patched.

15. The computing-implemented method of claim 14, wherein the optimization goal comprises increasing power efficiency, increasing computational power, or reducing memory fetches.

16. The computing-implemented method of claim 14, comprising determining whether one or more portions of the compiled shader can be patched based on the global constant buffer.

17. The computing-implemented method of claim 16, comprising:
   determining whether one or more global constants referenced in the compiled shader have corresponding values in the global constant buffer; and
   replacing the reference to the global constant in the compiled shader with the value of the global constant from the global constant buffer.

18. The computing-implemented method of claim 14, comprising:
   identifying one or more conditional statements in the compiled shader; and
   determining whether one or more portions of the compiled shader can be patched based on the identified conditional statements.

19. The computing-implemented method of claim 18, comprising replacing the one or more identified conditional statements with one or more unconditional statements, wherein the one or more unconditional statements correspond to values of one or more global constants from the global constant buffer.

20. The computing-implemented method of claim 14, comprising patching the compiled shader between a first instance the GPU executes the compiled shader and a second instance the GPU executes the compiled shader.

21. At least one non-transitory machine-readable storage medium comprising instructions that when executed by a computing device, cause the computing device to:
   determine whether one or more portions of a compiled shader can be patched in an executable format based on a global constant buffer, the compiled shader to comprise instructions in the executable format that are ready for execution via a GPU pipeline;
   generating one or more patched portions based on an optimization goal and the global constant buffer; and
   replace the one or more portions of the compiled shader with the one or more patched portions based on the determination that the one or more portions of the compiled shader can be patched.

22. The at least one non-transitory machine-readable storage medium of claim 21, the instructions, when executed by the computing device cause the computing device to:
   determine whether one or more global constants referenced in the compiled shader have corresponding values in the global constant buffer; and
   replace the reference to the global constant in the compiled shader with the value of the global constant from the global constant buffer.

23. The at least one non-transitory machine-readable storage medium of claim 21, the instructions, when executed by the computing device cause the computing device to:
   identify one or more conditional statements in the compiled shader; and
   determine whether one or more portions of the compiled shader can be patched based on the identified conditional statements.

24. The at least one non-transitory machine-readable storage medium of claim 23, the instructions, when executed by the computing device cause the computing device to replace the one or more identified conditional statements with one or more unconditional statements.

* * * * *